(12) United States Patent
Hoshi

(10) Patent No.: US 6,345,092 B1
(45) Date of Patent: Feb. 5, 2002

(54) SWITCH AND METHOD OF SEIZING OUTGOING TRUNK OF SAME

(75) Inventor: Rie Hoshi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/338,626

(22) Filed: Jun. 23, 1999

(30) Foreign Application Priority Data

Oct. 30, 1998 (JP) .......................................... 10-309951

(51) Int. Cl.$^7$ .......................... H04M 3/00; H04M 7/00; H04Q 3/62; H04Q 3/66; H04Q 3/70
(52) U.S. Cl. .................. 379/234; 379/221.07; 379/243
(58) Field of Search .................... 379/219, 210.01, 379/221.07, 225, 232, 234, 243, 901

(56) References Cited

U.S. PATENT DOCUMENTS

| | | | |
|---|---|---|---|
| 3,796,837 A | * | 3/1974 | Mathews ............... 379/221.01 |
| 4,679,187 A | * | 7/1987 | Irvin ........................... 370/252 |
| 5,452,351 A | * | 9/1995 | Yamamoto ............... 379/234 X |
| 5,537,469 A | * | 7/1996 | Beniston et al. ..... 379/221.07 X |
| 5,703,938 A | * | 12/1997 | Lucas et al. ......... 379/221.07 X |
| 5,781,624 A | * | 7/1998 | Mitra et al. .......... 379/221.07 X |
| 5,953,403 A | * | 9/1999 | Lefort et al. ............ 379/221.03 |
| 5,974,133 A | * | 10/1999 | Fleischer, III et al. ....... 379/230 |

FOREIGN PATENT DOCUMENTS

| | | | | |
|---|---|---|---|---|
| JP | 3-266593 | 11/1991 | ............ | H04Q/3/66 |
| JP | 9-149437 | 6/1997 | ............ | H04Q/3/58 |

* cited by examiner

Primary Examiner—Harry S. Hong
(74) Attorney, Agent, or Firm—Rosenman & Colin LLP (57) ABSTRACT

Outgoing trunks of a switch are divided into reserved trunks and non-reserved trunks. A controller seizes reserved trunks equally for calls from subscriber terminals regardless of whether a call is a reserved call or a non-reserved call in an uncongested condition in which rate of reserved-trunk utilization is low and seizes reserved trunks preferentially for reserved calls in a congested condition in which rate of reserved-trunk utilization is high.

13 Claims, 6 Drawing Sheets

| |
|---|
| RESERVED-CALL TELEPHONE NO. 1 |
| RESERVED-CALL TELEPHONE NO. 2 |
| RESERVED-CALL TELEPHONE NO. 3 |
| RESERVED-CALL TELEPHONE NO. 4 |
| RESERVED-CALL TELEPHONE NO. 5 |
| RESERVED-CALL TELEPHONE NO. 6 |
| RESERVED-CALL TELEPHONE NO. 7 |
| ⋮ |

← RCNT

FIG.3

TAT

| TG NO. | | | |
|---|---|---|---|
| TRUNK | RESERVED-TRUNK INFORMATION | IN-USE INFORMATION | ACTIVE INFORMATION |
| TRUNK 1 | RESERVED | IN USE | ACTIVE |
| TRUNK 2 | NON-RESERVED | NOT IN USE | FAULTY |
| --- | ----- | ---- | ---- |
| TRUNK n | NON-RESERVED | NOT IN USE | ACTIVE |

FIG.4

| TG NO. |
|---|
| INSTALLED TRUNK COUNT A |
| IDLE TRUNK COUNT B |
| IN-USE TRUNK COUNT C |
| FAULTY TRUNK COUNT D |
| RESERVED TRUNK COUNT a |
| IDLE RESERVED TRUNK COUNT b |
| IN-USE RESERVED TRUNK COUNT c |
| FAULTY RESERVED TRUNK COUNT d |

← URT

SWITCH AND METHOD OF SEIZING OUTGOING TRUNK OF SAME

BACKGROUND OF THE INVENTION

This invention relates to a switch and to a method of seizing an outgoing trunk of the switch. More particularly, the invention relates to a switch that allows a line to be used preferentially for a reserved call, and to a method of seizing an outgoing trunk of the switch.

A switch is connected to an adjacent switch via a trunk and office line (trunk line) so that signals may be sent to and received from the adjacent switch. However, there is a limit upon the number of trunks and number of office lines of a switch and, as a result, trunks and office lines cannot be allocated to all calls under conditions of congestion when calls concentrate. Accordingly, connection control is carried out in order that the capacity of a switch will not be exceeded in the event of congestion. For example, rate of trunk occupancy is monitored. When the rate of trunk occupancy reaches a predetermined value, this is regarded as being indicative of congestion and the level of the subscriber class that is to undergo connection control is changed automatically. For instance, a call from a remote area or a call from a public telephone is connected preferentially, thereby mitigating trunk congestion and lightening the load on the switch.

Depending upon the user, there are cases where it is desired for him, in the event of congestion, to communicate with any party using a line preferentially over other calling parties. In the prior art, a leased line is established between two parties decided beforehand by agreement, and the line is used exclusively only by these two parties. However, if the traffic between the two parties is light, use of the leased line becomes relatively expensive. Furthermore, the line cannot be used for communication with any party. Accordingly, it would be convenient to have an arrangement in which the user can communicate with any party using a line preferentially over other calling parties, even if the line usage charge is somewhat high.

SUMMARY OF THE INVENTION

Accordingly, an object of the present invention is to divide outgoing trunks into (1) reserved trunks and (2) non-reserved trunks and, in the event of congestion, seize a reserved trunk preferentially for a call (reserved call) from the telephone terminal of a user who has concluded a line priority-use agreement.

Another object of the present invention is to arrange it so that reserved trunks can be seized equally for all calls regardless of whether a call is a reserved call or a non-reserved call when an uncongested condition prevails.

A further object of the present invention is to provide a reserved-call telephone service in which a reserved trunk is seized preferentially for a reserved call in dependence upon degree of congestion when a congested condition prevails, this service being provided while exploiting the reserved trunk efficiently and while safeguarding reserved-call rights.

According to the present invention, there is provided an outgoing-trunk seizure method comprising the steps of dividing outgoing trunks into reserved trunks and non-reserved trunks, seizing reserved trunks equally for calls regardless of whether a call is a reserved call or a non-reserved call in an uncongested condition in which rate of reserved-trunk utilization is low, and seizing reserved trunks preferentially for reserved calls in a congested condition in which rate of reserved-trunk utilization is high. In this case, a terminal that will generate a reserved call is registered in advance. If a calling terminal is such a registered terminal, it is judged that the call is a reserved call. Further, degree of priority at which a reserved trunk is seized for a reserved call is changed in dependence upon degree of congestion.

Further, according to the present invention, whether a congested condition prevails is decided based upon rate of utilization of a reserved trunk and rate of utilization of trunks in a trunk group overall.

Further, according to the present invention, (1) when degree of congestion is low, call restriction based upon call gap is performed to increase ratio of seizure of a reserved trunk based upon a reserved call, (2) when degree of congestion is high, call restriction for seizing a reserved trunk only for a reserved call is performed, and (3) when rate of reserved-trunk utilization is 100%, a restriction is applied to all calls and no reserved trunk is seized. Wherein the restriction is removed when rate of reserved-trunk utilization falls below a set value.

If the arrangement described above is adopted, a reserved-call telephone service can be provided while exploiting reserved trunks efficiently and safeguarding reserved-call rights.

Other features and advantages of the present invention will be apparent from the following description taken in conjunction with the accompanying drawings.

Figure 1:
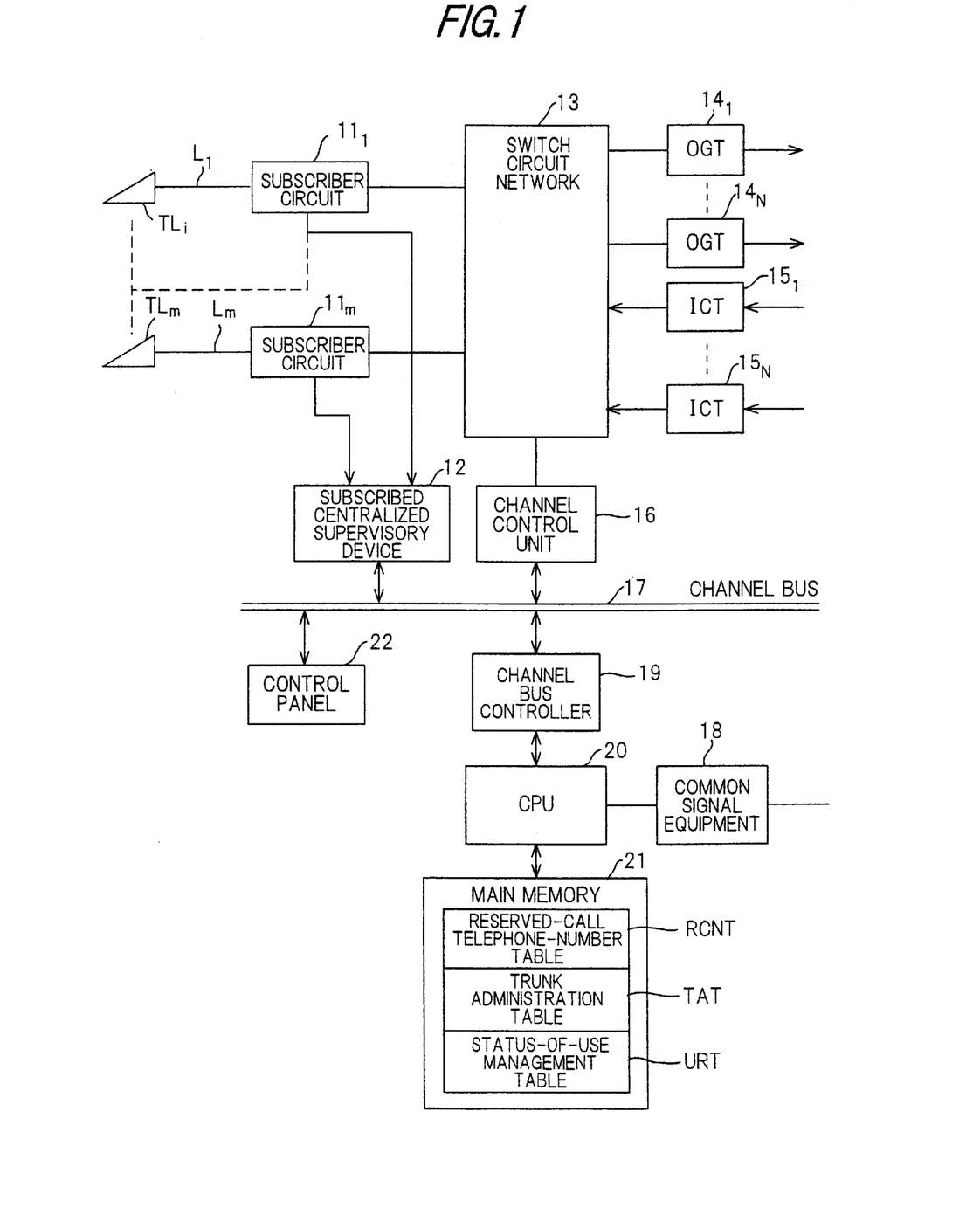
FIG. 1 is a block diagram showing the construction of a digital switch according to the present invention.

DESCRIPTION OF THE PREFERRED EMBODIMENTS (A) Construction of Digital Switch According to the Present Invention FIG. 1 is a block diagram illustrating the construction of an STM digital switch according to the present invention. Subscriber circuits $11_1$–$11_m$ are connected to subscriber terminals $TL_1$–$TL_m$ such as telephones by telephone lines $L_1$–$L_m$, respectively. Each subscriber circuit has (1) a battery feed function for supplying a telephone with a call current to actuate a microphone, (2) supervision function for supervising status of the telephone, e.g., calling/answering/ring-off, by detecting the DC loop of the telephone line has been formed or severed, (3) a hybrid function for converting a telephone line from two wires to four wires, and (4) a codec function for converting an analog signal such as voice to a PCM digital signal and converting a PCM digital signal to an analog voice signal. A subscriber centralized supervisory device 12 discriminates the on-hook/off-hook (DC loop formed/severed) status of each telephone as well as dialed numerals and communicates this to a central processing unit (CPU) 20.

A switch circuit network 13 is composed of spatial switches, time switches, etc. Outgoing trunks (OGT) $14_1$–$14_N$ convert an NRZ code, which is used within the switch, to an AMI code used on the side of a digital trunk line, and perform call supervision. Incoming trunks (ICT) $15_1$–$15_N$ perform code conversion, call supervision and clock extraction, etc. The outgoing trunks $14_1$–$14_N$ and incoming trunks $15_1$–$15_N$ are connected to a plurality of neighboring switches via respective ones of trunk lines. Digital signals to neighboring switches are sent from the outgoing trunks OGT, and digital signals from neighboring switches are input to the incoming trunks ICT. A number of the outgoing trunks and a number of the incoming trunks are provided for each of the neighboring switches, and one or more trunk groups TG is constructed for every neighboring switch.

A channel control unit 16 connects/disconnects a path by controlling the switch circuit network 13 in accordance with a command from the CPU 20. Numeral 17 denotes a channel bus. Common channel signaling equipment (CSE) 18 sends and receives common channel signals. Numeral 19 denotes a channel bus controller. The CPU 20 performs call processing control, reserved-trunk seizure-restriction control, described later, according to the present invention, and control for when calls are originated and rung off. A main memory 21 stores various data, tables RCNT, TAT and URT (described later), and results of processing, etc. A control panel 22 is for entering reserved-call telephone numbers and restriction-level reference data, etc., using commands.

(B) Various Tables

Figure 2:
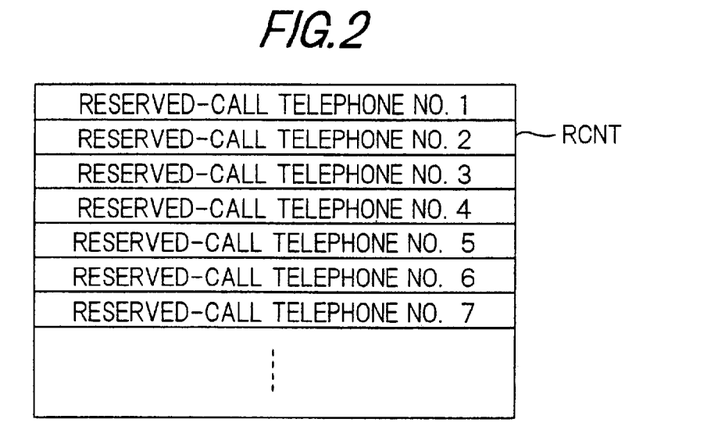
FIG. 2 is a diagram useful in describing a reserved-call telephone-number table.
Figure 3:
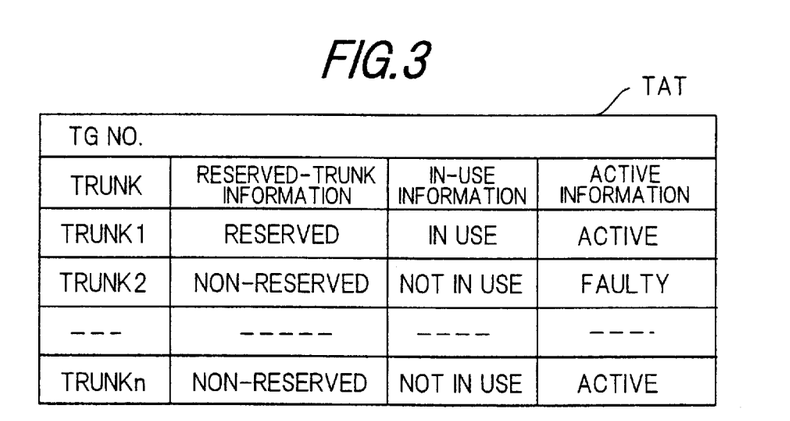
FIG. 3 is a diagram useful in describing a trunk administration table.
Figure 4:
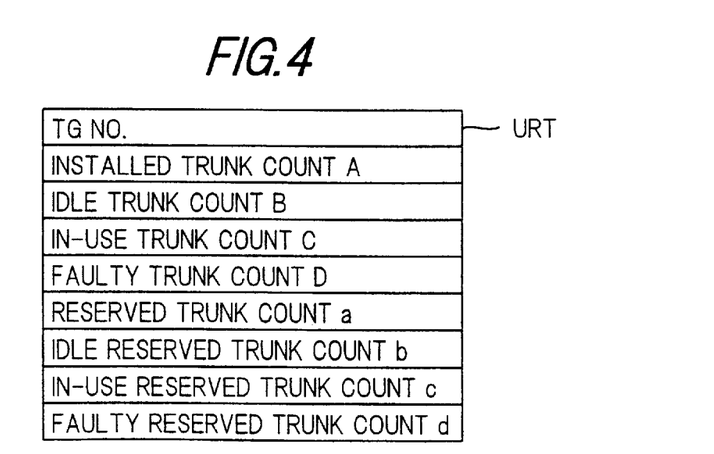
FIG. 4 is a diagram useful in describing a state-of-use management table.

FIGS. 2 to 4 are diagrams useful in describing various tables relating to the present invention. These tables are stored in the main memory 21.

FIG. 2 shows a reserved-call telephone-number table RCNT. The telephone numbers of user terminals for which agreements have been concluded to use a line preferentially are written in this table as reserved-call telephone numbers.

Figure 5:
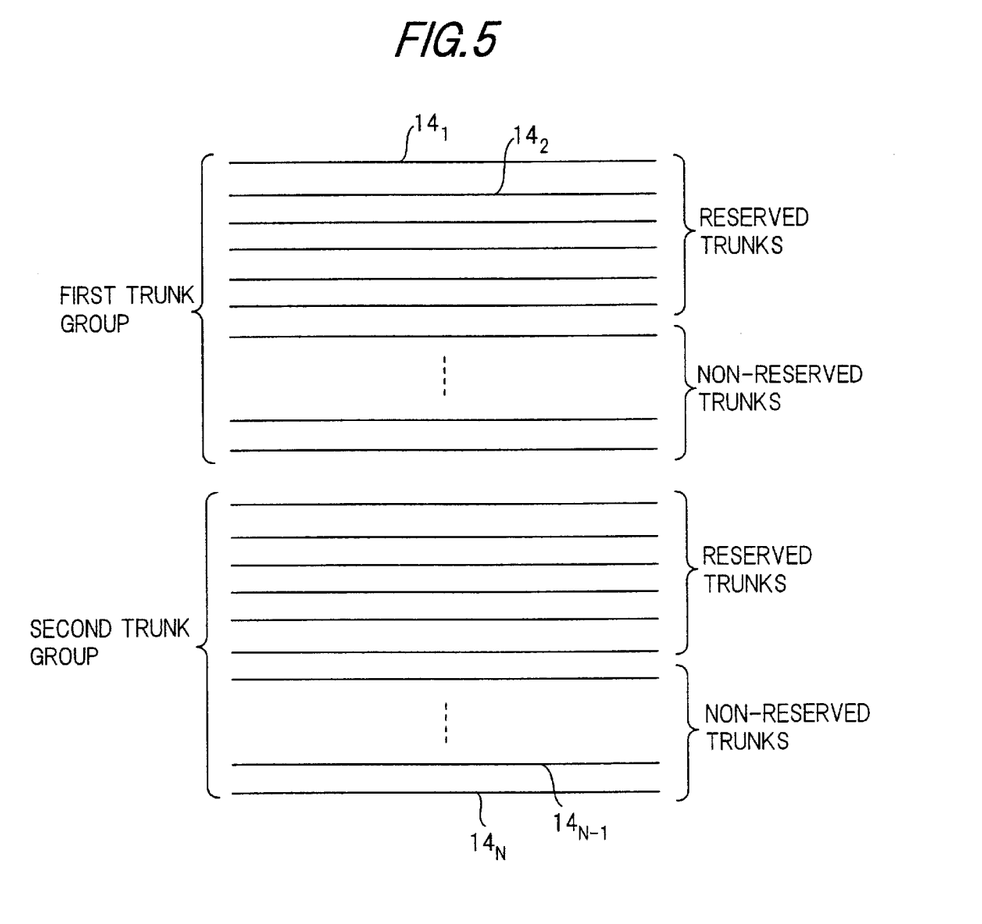
FIG. 5 is a diagram useful in describing a reserved trunks and non-reserved trunks.

FIG. 3 shows a trunk administration table TAT. According to the present invention, as shown in FIG. 5, the number of outgoing trunks $14_1$–$14_N$ are divided into a plurality of trunk groups, several of the outgoing trunks constituting each trunk group are made reserved trunks, and the remaining outgoing trunks of each trunk group are made non-reserved trunks. For each trunk group, (1) reserved trunks are seized (used) equally for calls regardless of whether a call is a reserved call or a non-reserved call when rate of reserved-trunk utilization is low, and (2) reserved trunks are seized preferentially for reserved calls when rate of reserved-trunk utilization is high. In order to make such control possible, a trunk administration table TAT of the kind shown in FIG. 3 is provided for each trunk group TG, and the information of each trunk constructing the trunk group TG is retained in the table. The trunk information includes (1) a distinction between a reserved trunk and non-reserved trunk (i.e., reserved-trunk information), (2) a distinction as to whether a trunk is or is not currently in use (i.e., in-use information), and (3) a distinction as to whether or not a trunk is faulty (i.e., active information).

FIG. 4 illustrates a status-of-use management table URT. This table retains, for each trunk group TG, information necessary for ascertaining status of use of all trunks and status of use of reserved trunks. Specifically, for each trunk group, the status-of-use management table URT retains (1) installed trunk count A, (2) idle trunk count B, (3) in-use trunk count C, (4) faulty trunk count D, (5) reserved trunk count a, (6) idle reserved trunk count b, (7) in-use reserved trunk count c, and (8) faulty reserved trunk count d. Trunk utilization rate α (%) of the group overall and reserved-trunk utilization rate β (%) are computed in accordance with the following equations:

α=(C+D)×100/A or α=(C/A)×100

β=(c+d)×100/a or β=(c/a)×100

(C) Restriction on Seizure of Reserved Trunks

Figure 6:
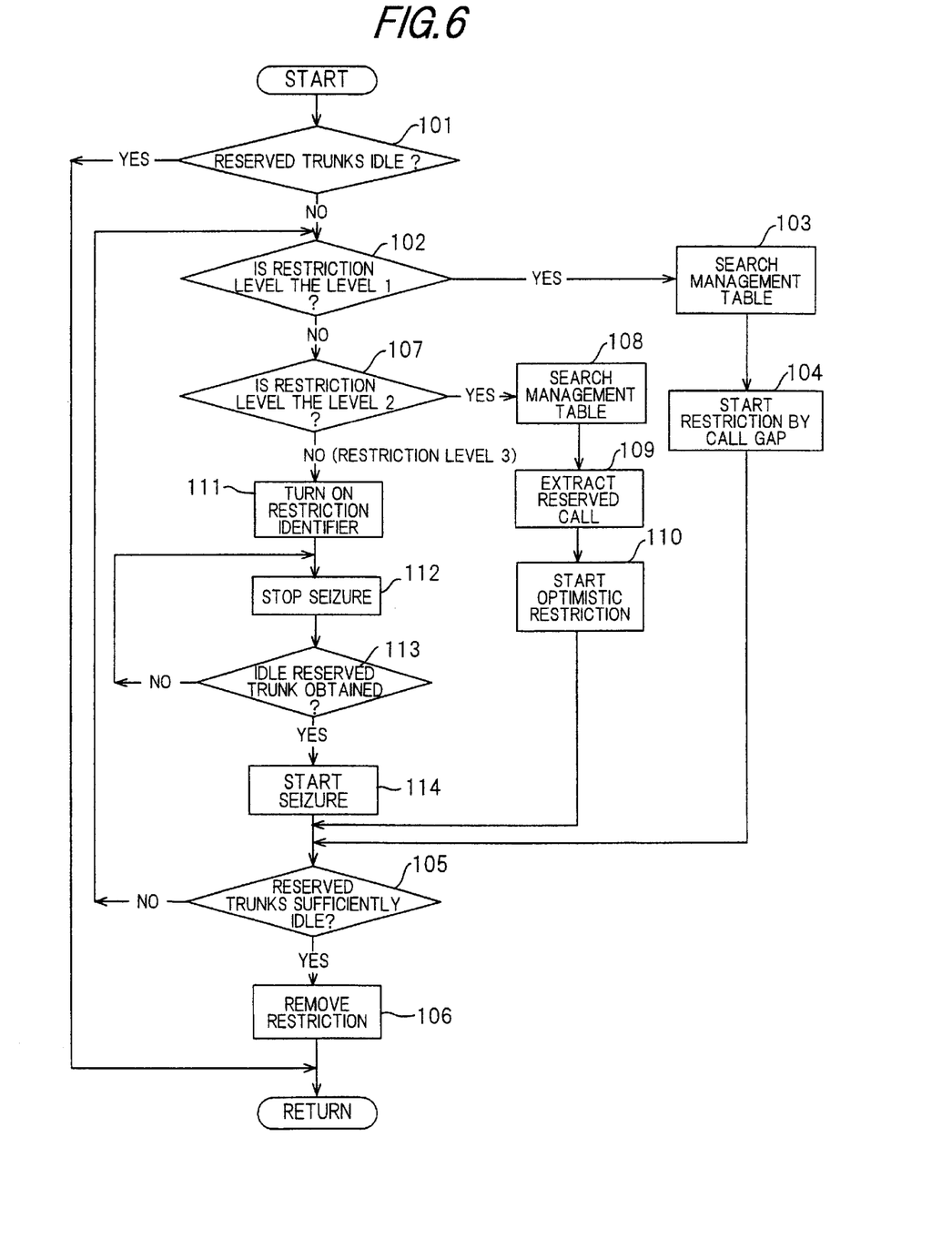
FIG. 6 is a flowchart showing control for restricting seizure of reserved trunks.

FIG. 6 is a flowchart showing control for restricting seizure of reserved trunks according to the present invention. Control is performed in dependence upon the degree (restriction level) of congestion.

According to the present invention, (1) in an uncongested state, which is one where the reserved-trunk utilization rate β is low, reserved trunks are seized equally for calls regardless of whether a call is a reserved call or a non-reserved call. (2) In a congested state, which is one where the reserved-trunk utilization rate β is high, (a) call restriction based upon call gap is performed to increase the ratio of seizure of a reserved trunk based upon a reserved call when degree of congestion is low, (b) call restriction for seizing a reserved trunk only for a reserved call is performed when degree of congestion is high, and (c) a restriction is applied to all calls and no reserved trunk is seized when the reserved-trunk utilization rate β is 100%, this restriction being removed when reserved-trunk utilization rate falls below a set value.

More specifically, for each trunk group, the CPU 20 periodically calculates the trunk utilization rate α of the group overall and reserved-trunk utilization rate β and determines whether the inequalities α<50%, β<60% hold. That is, the CPU 20 determines whether reserved trunks have become sufficiently idle (step 101). If the answer is "YES", then the CPU 20 regards this as being indicative of the uncongested state (restriction level 0). In case of restriction level 0, reserved trunks are seized equally for calls regardless of whether a call is a reserved call or non-reserved call. As a result, when the reserved-trunk utilization rate is low, a reserved trunk can be seized even for a non-reserved call, thus making it possible to efficiently exploit all trunks of a trunk group.

If it is found at step 101 that the trunk utilization rate α of the overall group is less than 50% and that the reserved-trunk utilization rate β is 60% or greater, the CPU 20 regards this as being indicative of the congested state and examines the degree of congestion. Specifically, the CPU 20 checks to see whether the reserved-trunk utilization rate β falls within the range 60–80% (step 102). If the reserved-trunk utilization rate β does fall within the range 60–80%, it is construed that the degree of congestion is low and, hence, that the restriction level is 1. At restriction level 1, a call-gap restriction is applied (steps 103, 104). That is, if a reserved call is generated in a time period $T_A$ within a fixed time period (=$T_A$+$T_B$), a reserved trunk is seized and allocated. A reserved trunk is not seized and allocated even if a reserved call is generated in a time period $T_B$. Further, if a non-reserved call is generated in a time period $T_C$ within a fixed time period (=$T_C$+$T_D$), a reserved trunk is seized and allocated. A reserved trunk is not seized and allocated even if a non-reserved call is generated in a time period $T_D$. It should be noted that $T_A$>$T_C$, $T_B$<$T_D$ hold as well as $T_A$+$T_B$=$T_C$+$T_D$.

Since $T_A$>$T_C$, $T_B$<$T_D$ hold, the seizure ratio of reserved calls with respect to reserved trunks increases and the seizure ratio of non-reserved calls decreases. This restriction method of controlling reserved-trunk seizure ratio by changing the ratio between time during which reserved-trunk seizure is possible and time during which reserved-trunk seizure is not possible is referred to as call-gap restriction.

The CPU 20 subsequently checks to see whether reserved trunks have become sufficiently idle, e.g., whether the reserved-trunk utilization rate β has fallen below 40% (step 105). If reserved trunks have not become sufficiently idle (β>40%), the CPU 20 executes processing from step 102 onward. If reserved trunks have become sufficiently idle (β<40%), however, the CPU 20 removes the restriction (step 106) and then executes processing from step 101 onward.

If it is found at step 102 that the overall trunk utilization rate α is equal to or greater than 50% and that the reserved-trunk utilization rate β is equal to or greater than 80%, then the CPU 20 determines whether the reserved-trunk utilization rate β is less than 100% (step 107).

If the reserved-trunk utilization rate β falls within the range 80%≦β<100%, the degree of congestion is high and, hence, it is construed that the restriction level is level 2. At restriction level 2, an optimistic restriction is applied (steps 108–110). That is, the CPU 20 refers to the reserved-call telephone-number table RCNT to determine whether the call is a reserved call. A reserved trunk is seized if the call is a reserved trunk but a reserved trunk is not seized if the call is a non-reserved trunk. By virtue of the foregoing control, seizure of a reserved trunk based upon a non-reserved call can be restricted when reserved-call traffic has increased. This makes it possible to safeguard reserved-call rights.

Figure 7A:
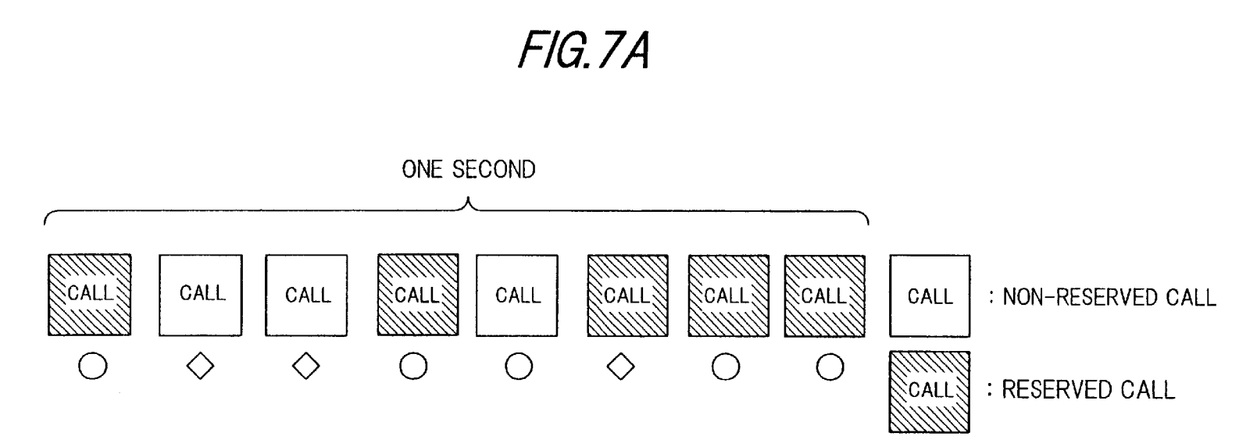
FIGS. 7A, 7B are diagrams useful in describing ratio of seizure of reserved trunks based upon reserved calls and non-reserved calls.
Figure 7B:
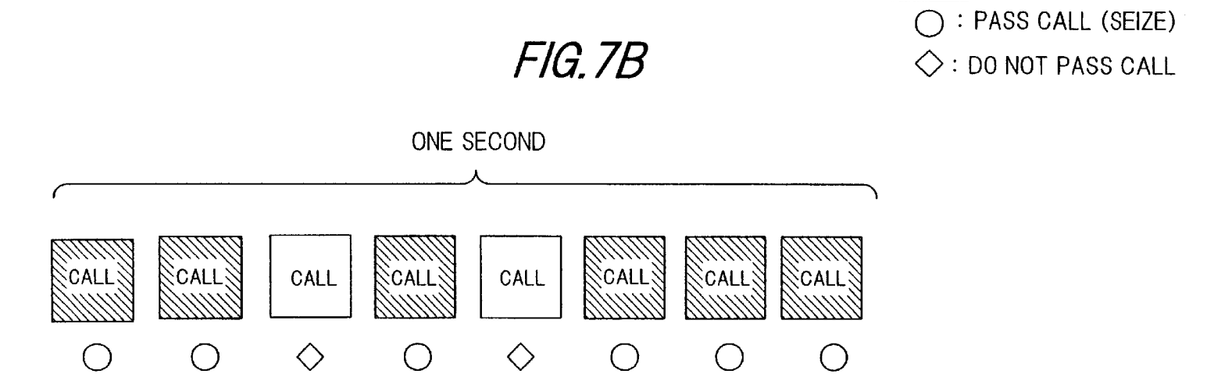

FIGS. 7A and 7B are diagrams useful in describing ratio of seizure of reserved trunks based upon reserved calls and non-reserved calls, in which FIG. 7A is for the case of call-gap restriction and FIG. 7B for the case of optimistic restriction. In the case of call-gap restriction, the seizure ratio is low but a reserved trunk can be seized even if a call is a non-reserved call. In the case of optimistic restriction, however, a reserved trunk cannot be seized if a call is a non-reserved call.

The CPU 20 subsequently checks to see whether reserved trunks have become sufficiently idle (step 105). If reserved trunks have not become sufficiently idle (β>40%), the CPU 20 executes processing from step 102 onward. If reserved trunks have become sufficiently idle (β<40%), however, the CPU 20 removes the restriction (step 106) and then executes processing from step 101 onward.

If the reserved-trunk utilization rate β is found to be 100% at step 107, the restriction level is deemed to be level 3. At restriction level 3, a pessimistic restriction is applied (steps 111–114). That is, the CPU turns on a restriction identifier of the trunk group of interest (step 111) and stops seizure of reserved trunks of this trunk group for all calls for several seconds (step 112). If a reserved trunk becomes idle during these several seconds, the CPU turns off the restriction identifier thereby reserved-trunk seizure is resumed (step 114). If a reserved trunk does not become idle during these several seconds, the CPU continues to stop seizure.

The CPU 20 subsequently checks to see whether reserved trunks have become sufficiently idle (step 105). If reserved trunks have not become sufficiently idle (β>40%), the CPU 20 executes processing from step 102 onward. If reserved trunks have become sufficiently idle (β<40%), however, the CPU 20 removes the restriction (step 106) and then executes processing from step 101 onward.

(D) Control at Time of Call Origination and Ring-off

Figure 8:
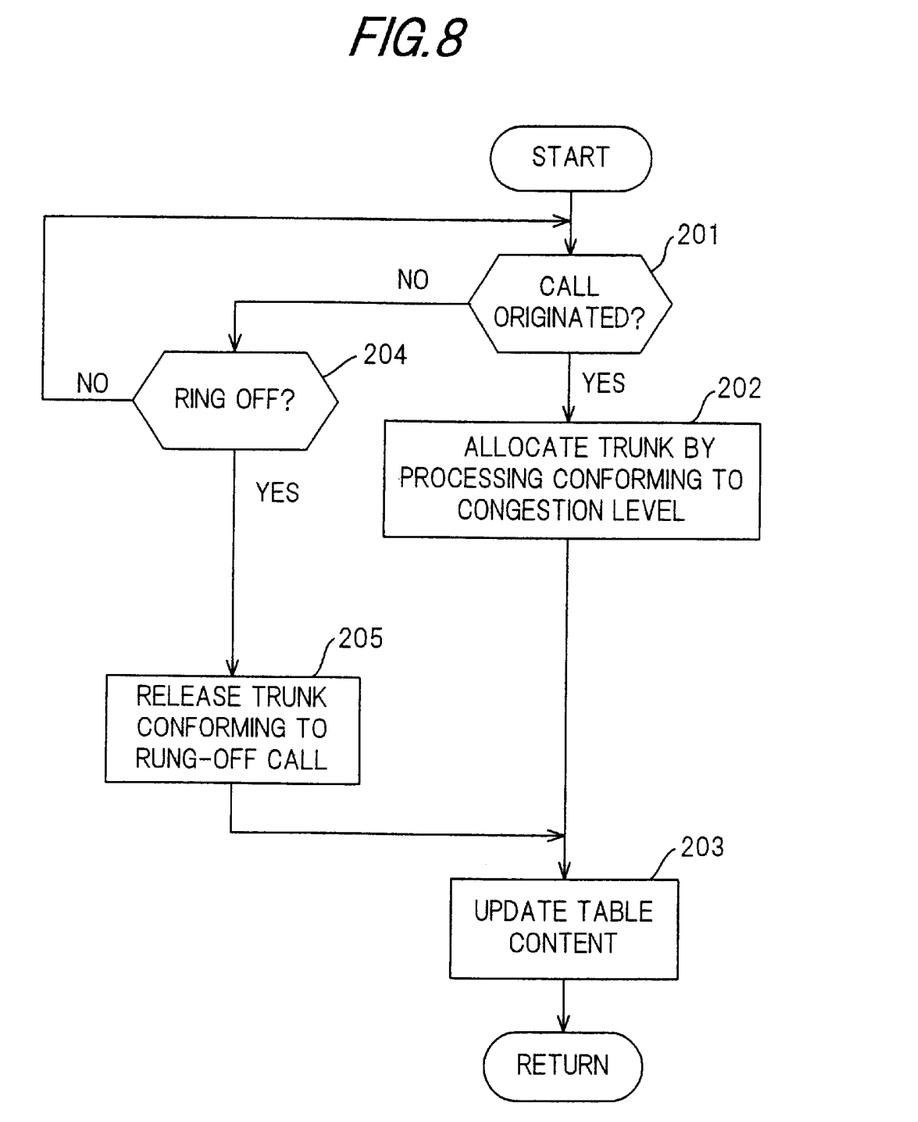
FIG. 8 is a flowchart of processing executed at call origination and ring-off.

FIG. 8 is a flowchart of processing executed by the CPU 20 at call origination and ring-off.

The CPU 20 checks to determine whether a subscriber terminal has originated a call (step 201). If a call has been originated, the CPU 20 executes trunk seizure processing in dependence upon whether the call is a reserved call or non-reserved call and whether the restriction level is 0, 1, 2 or 3 (step 202). More specifically, if a call is generated, the CPU 20 checks to see whether the telephone number of the originating terminal has been registered in the reserved-call telephone-number table RCNT (FIG. 2). The CPU judges that the call is a reserved call if the telephone number has been registered, and judges that the call is a non-reserved call if the telephone number has not been registered. The CPU 20 then seizes a trunk in accordance with (1) to (4) below in dependence upon the restriction levels 0 to 3 already obtained by the processing of FIG. 6.

(1) If the restriction level is 0, the CPU 20 seizes an idle trunk in the trunk group and allocates it to the call regardless of whether the call is a reserved call or non-reserved call and without being aware of whether the trunk is a reserved trunk or non-reserved trunk.

(2) If the restriction level is 1, the CPU 20 seizes reserved trunks and allocates them to reserved and non-reserved calls in accordance with call-gap restriction. If a reserved trunk cannot be allocated to a call owing to call-gap restriction control, the CPU 20 seizes and allocates an idle trunk among the non-reserved trunks in the trunk group.

(3) If the restriction level is 2, the CPU 20 seizes an idle reserved trunk from among the reserved trunks and allocates it to a reserved call in accordance with optimistic restriction. In regard to a nonreserved call, on the other hand, the CPU 20 seizes an idle trunk from among the non-reserved idle trunks in the group and allocates this idle trunk.

(4) If the restriction level is 3, the CPU 20 does not allocate a reserved trunk to any call in accordance with pessimistic restriction. If an idle trunk exists among the non-reserved trunks in the trunk group, the CPU 20 seizes this trunk and allocates it.

Thus, if the CPU 20 seizes a prescribed outgoing trunk and allocates it to a call, the CPU updates the relevant portions of the trunk administration table TAT (FIG. 3) and status-of-use management table URT (FIG. 4) (step 203). In other words, the in-use information regarding a seized trunk in the trunk administration table TAT is changed to "in use" and the counts of the relevant items in the status-of-use management table URT are increased or decreased.

If it is found at step 201 that a call has not originated, the CPU 20 determines whether any call has attained a ring-off state (step 204). In the event of ring-off, the CPU 20 releases the outgoing trunk that corresponds to the rung-off call (step 205) and updates the relevant portions of the trunk administration table TAT and status-of-use management table URT (step 203).

When the content of the status-of-use management table URT is updated, the reserved-trunk utilization rate β and the trunk utilization rate α of the overall group change and so does the restriction level. At step 202, therefore, trunk seizure and allocation control conforming to the new restriction level is carried out.

(E) Modification

In the embodiment described above, reserved-trunk seizure restriction control is carried out in dependence upon the degree of congestion (restriction levels 1, 2, 3). However, seizure restriction control conforming to degree of congestion need not necessarily be performed. That is, control can be carried out to seize reserved trunks equally for all calls in an uncongested state and to perform either call-gap restriction or optimistic restriction in a congested state.

Further, in the embodiment described above, restriction level is decided upon taking into account both the trunk utilization rate a of the overall trunk group and the reserved-trunk utilization rate β, and seizure restriction control conforming to this restriction level is carried out. However, the restriction level can be decided based solely upon the reserved-trunk utilization rate β and seizure restriction control conforming to this restriction level can be performed.

Accordingly, in an uncongested state, which is one where the reserved-trunk utilization rate is low, control can be performed in such a manner that reserved trunks are seized equally for calls regardless of whether a call is a reserved call or a non-reserved call. In a congested state, which is one where the reserved-trunk utilization rate is high, control can be performed in such a manner that reserved trunks are seized preferentially for reserved calls. Further, in the event of congestion, it is possible to raise the degree of priority at which reserved trunks are seized for reserved calls in dependence upon the reserved-trunk utilization rate.

Thus, in accordance with the present invention as described above, outgoing trunks are divided into reserved trunks and non-reserved trunks, and a reserved trunk can be used preferentially for a call (a reserved call) from the telephone terminal of a user who has concluded a line priority-use agreement.

Further, in accordance with the present invention, reserved trunks can be seized equally for all calls regardless of whether a call is a reserved call or a non-reserved call when an uncongested condition prevails. This makes it possible to exploit all trunks in a trunk group effectively.

Further, in accordance with the present invention, reserved trunks are seized equally for all calls when an uncongested condition prevails, and a reserved trunk is seized preferentially for a reserved call when a congested condition prevails. This makes it possible to provide a reserved-call telephone service while exploiting reserved trunks efficiently and while safeguarding reserved-call rights.

Further, in accordance with the present invention, the degree of priority at which a reserved trunk is allocated to a reserved call is controlled in dependence upon degree of congestion. This makes possible fine reserved-trunk seizure restriction control.

As many apparently widely different embodiments of the present invention can be made without departing from the spirit and scope thereof, it is to be understood that the invention is not limited to the specific embodiments thereof except as defined in the appended claims.

What is claimed is:

1. A method of seizing an outgoing trunk of a switch which allows a line to be used preferentially for a reserved call, comprising the steps of:
    dividing outgoing trunks into reserved trunks and non-reserved trunks;
    seizing reserved trunks equally for calls regardless of whether a call is a reserved call or a non-reserved call in an uncongested condition in which rate of reserved-trunk utilization is low; and
    seizing reserved trunks preferentially for reserved calls in a congested condition in which rate of reserved-trunk utilization is high.

2. The method according to claim 1, further comprising a step of raising degree of priority at which a reserved trunk is seized for a reserved call in dependence upon rate of reserved-trunk utilization when the congested condition prevails.

3. The method according to claim 1, further comprising steps of:
    registering in advance a terminal that will generate a reserved call; and
    if a call originates from a terminal that is the registered terminal, judging that the call is a reserved call.

4. The method according to claim 1, further comprising a step of deciding whether or not the congested condition prevails based upon rate of reserved-trunk utilization and rate of trunk utilization of a trunk group overall.

5. The method according to claim 1, further comprising a step of performing call restriction, when the congested condition prevails, by call gap for controlling reserved-trunk seizure ratio by changing ratio between time during which reserved-trunk seizure is possible and time during which reserved-trunk seizure is not possible, thereby raising reserved-trunk seizure ratio based upon a reserved call and lowering reserved-trunk seizure ratio based upon a non-reserved call.

6. The method according to claim 1, further comprising a step of seizing a reserved trunk only for a reserved call when the congested condition prevails.

7. The method according to claim 1, further comprising steps of:
    forgoing seizure of a reserved trunk by applying a restriction to all calls when rate of reserved-trunk utilization is 100%; and
    removing the restriction when rate of reserved-trunk utilization falls below a set value.

8. The method according to claim 1, further comprising steps of:
    performing seizure restriction control, when degree of congestion is low, by call gap for controlling reserved-trunk seizure ratio by changing ratio between time during which reserved-trunk seizure is possible and time during which reserved-trunk seizure is not possible;
    performing restrictive control for seizing a reserved trunk only for a reserved call when degree of congestion is high;
    forgoing seizure of a reserved trunk by applying a restriction to all calls when rate of reserved-trunk utilization is 100%; and
    removing the restriction when rate of reserved-trunk utilization falls below a set value.

9. A switch having a number of outgoing trunks and allowing a line to be used by seizing an outgoing trunk preferentially for a reserved call, comprising:
    storage means for storing a distinction indicating whether an outgoing trunk is a reserved trunk or a non-reserved trunk and a distinction as to whether an outgoing trunk is in use or not in use; and
    a controller for seizing reserved trunks equally for calls regardless of whether a call is a reserved call or a non-reserved call in an uncongested condition in which rate of reserved-trunk utilization is low, and seizing reserved trunks preferentially for reserved calls in a congested condition in which rate of reserved-trunk utilization is high.

10. The switch according to claim 9, wherein said controller raises degree of priority at which a reserved trunk is seized for a reserved call in dependence upon rate of reserved-trunk utilization when the congested condition prevails.

11. The switch according to claim 9, wherein said storage means stores the number of a terminal that is a reserved-call generating terminal for generating a reserved call; and
    said controller compares the stored number with the number of a terminal from which a call originates, judges whether this terminal from which the call originates is a reserved-call generating terminal and determines whether the call is a reserved call based upon the judgment made.

12. The switch according to claim 9, wherein said controller decides whether or not the congested condition prevails based upon rate of reserved-trunk utilization and rate of trunk utilization of a trunk group overall.

13. The switch according to claim 9, wherein said controller performs call restriction, when degree of congestion is low, by call gap for controlling reserved-trunk seizure ratio by changing ratio between time during which reserved-trunk seizure is possible and time during which reserved-trunk seizure is not possible, thereby raising reserved-trunk seizure ratio based upon a reserved call and lowering reserved-trunk seizure ratio based upon a non-reserved call;

performs seizure restriction for seizing a reserved trunk only for a reserved call when degree of congestion is high;

forgoes seizure of a reserved trunk by applying a restriction to all calls when rate of reserved-trunk utilization is 100%; and removes the restriction when rate of reserved-trunk utilization falls below a set value.

* * * * *